(12) United States Patent
Crotty, III

(10) Patent No.: US 6,612,637 B1
(45) Date of Patent: Sep. 2, 2003

(54) SLIDING SUN VISOR ASSEMBLY

(75) Inventor: Willard E. Crotty, III, Quincy, MI (US)

(73) Assignee: Crotty Corporation, Quincy, MI (US)

( * ) Notice: Subject to any disclaimer, the term of this patent is extended or adjusted under 35 U.S.C. 154(b) by 0 days.

(21) Appl. No.: 10/214,537

(22) Filed: Aug. 8, 2002

(51) Int. Cl.[7] .................................................. B60J 3/00
(52) U.S. Cl. ................. 296/97.11; 296/97.1; 296/97.12
(58) Field of Search ............................. 296/97.1, 97.9, 296/97.11, 97.12

(56) References Cited

U.S. PATENT DOCUMENTS

| | | | | |
|---|---|---|---|---|
| 4,623,188 A | * | 11/1986 | Juraschek et al. | 296/97.5 |
| 4,810,023 A | * | 3/1989 | Kawada | 296/97.8 |
| 4,952,008 A | * | 8/1990 | Lobanoff et al. | 296/97.8 |
| 4,999,746 A | * | 3/1991 | Svensson | 296/97.2 |
| 6,033,005 A | * | 3/2000 | Crotty, III | 296/97.1 |
| 6,131,985 A | * | 10/2000 | Twietmeyer et al. | 296/97.12 |
| 6,450,560 B1 | * | 9/2002 | Sturt et al. | 296/97.2 |
| 6,474,717 B2 | * | 11/2002 | Viertel et al. | 296/97.11 |

* cited by examiner

Primary Examiner—Dennis H. Pedder
Assistant Examiner—Greg Blankenship
(74) Attorney, Agent, or Firm—Rader, Fishman & Grauer, PLLC

(57) ABSTRACT

A vehicle sun visor assembly is provided that includes a foundation having a pair of foundation halves. The foundation halves include corresponding shapes that define at least a portion of an edge of the sun visor. A connecting member is secured to an upper portion of each foundation half to define an upper edge of the sun visor. The connecting member includes a pair of connecting halves that cooperatively form a channel. A rotation control member, which is disposed within the channel, is moveably connected to a first end of a visor support rod. A second end of the visor support rod extends outwardly from the foundation is attached to a mounting bracket assembly. The sun visor assembly is slidable along the support rod and the support rod is extensible from and retractable into the sun visor assembly.

35 Claims, 15 Drawing Sheets

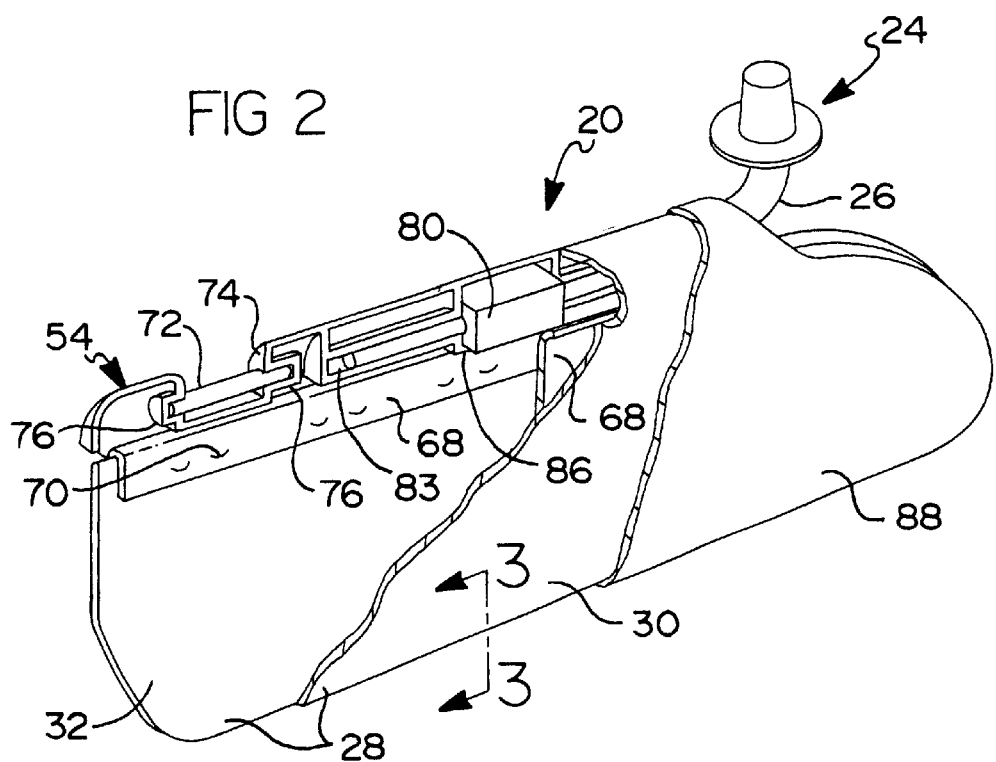
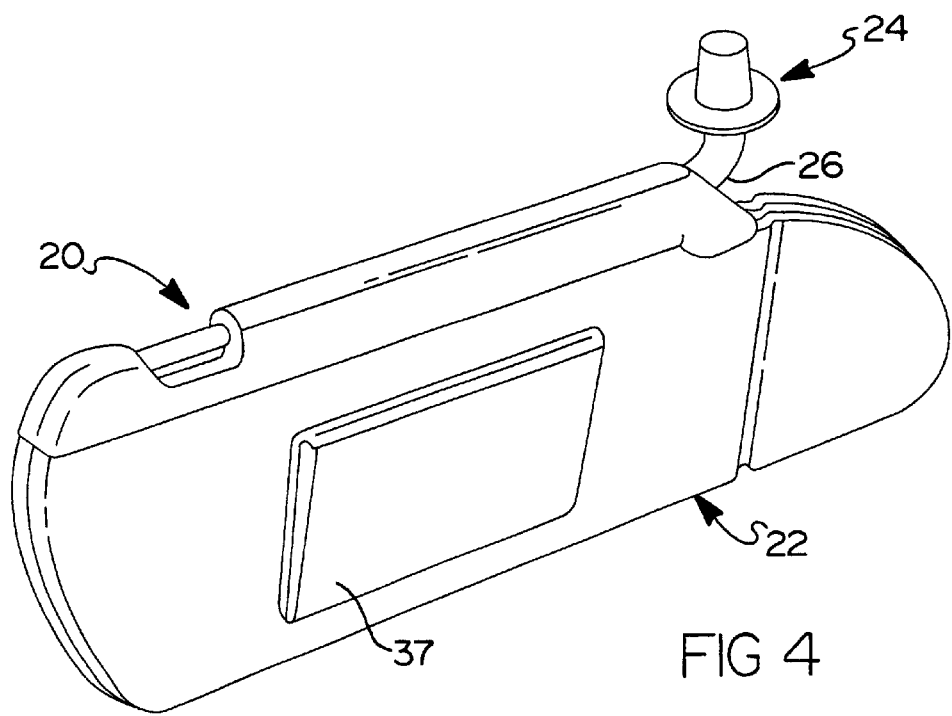

FIG 5
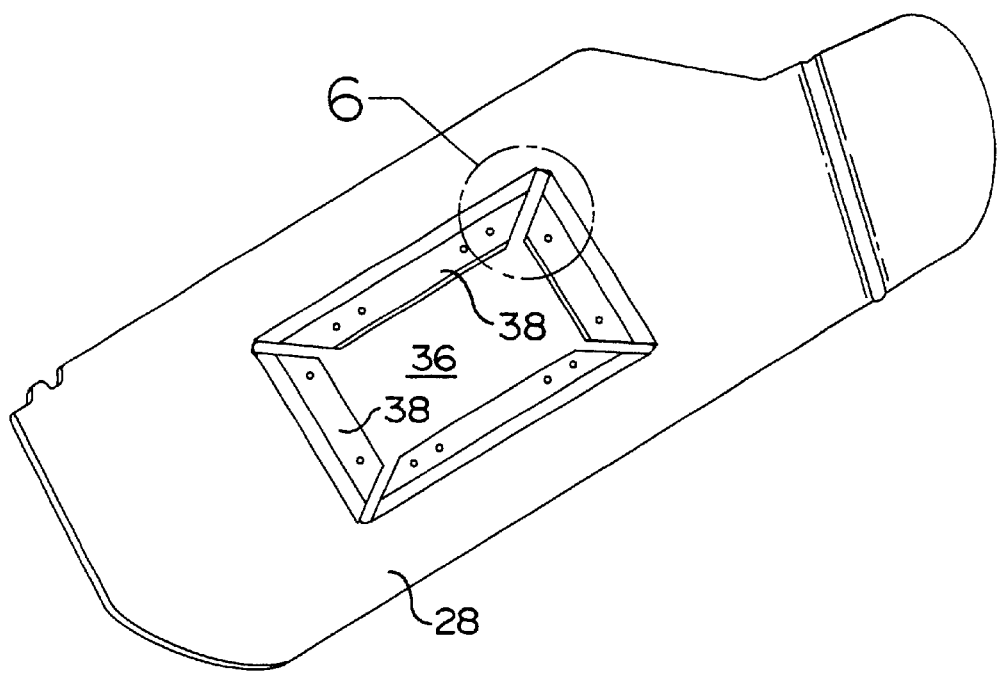
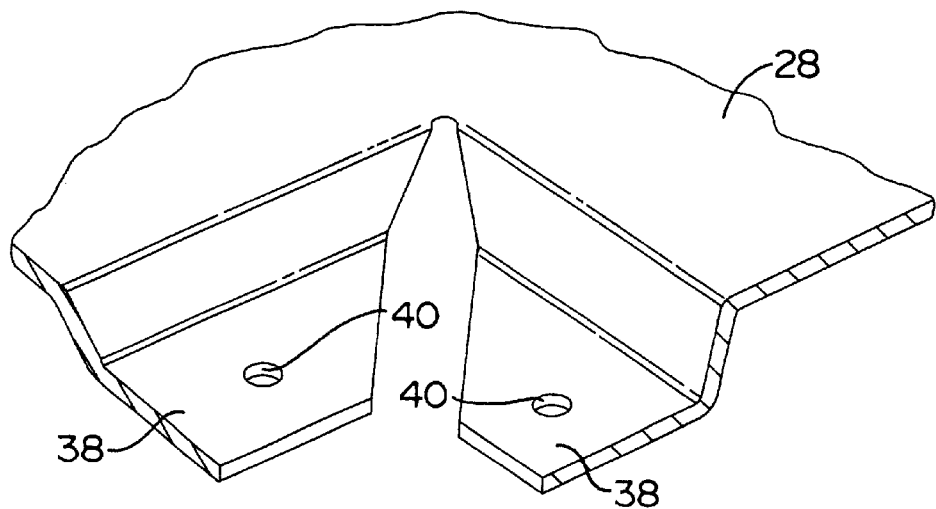
FIG 6

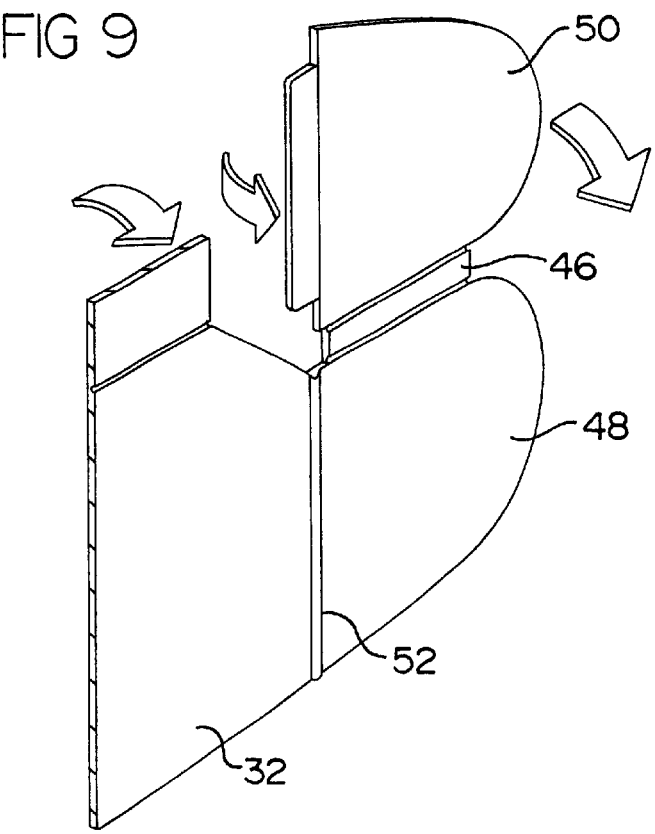
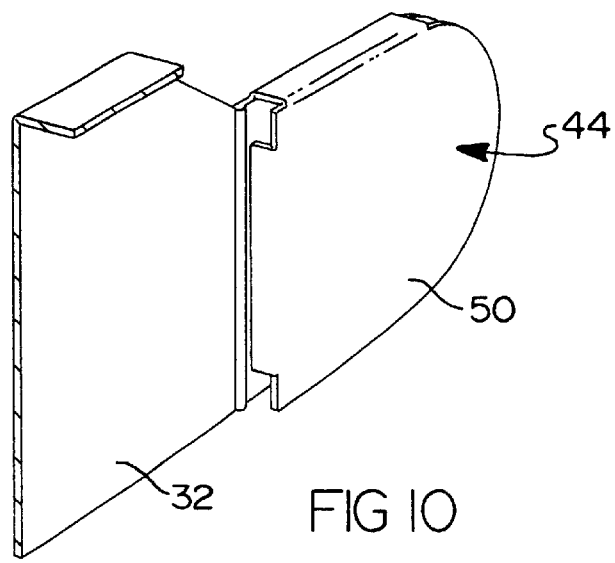

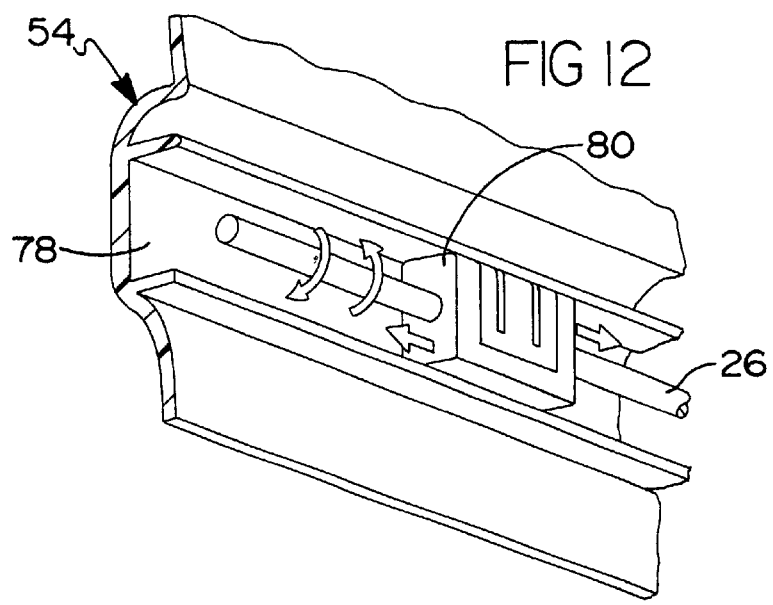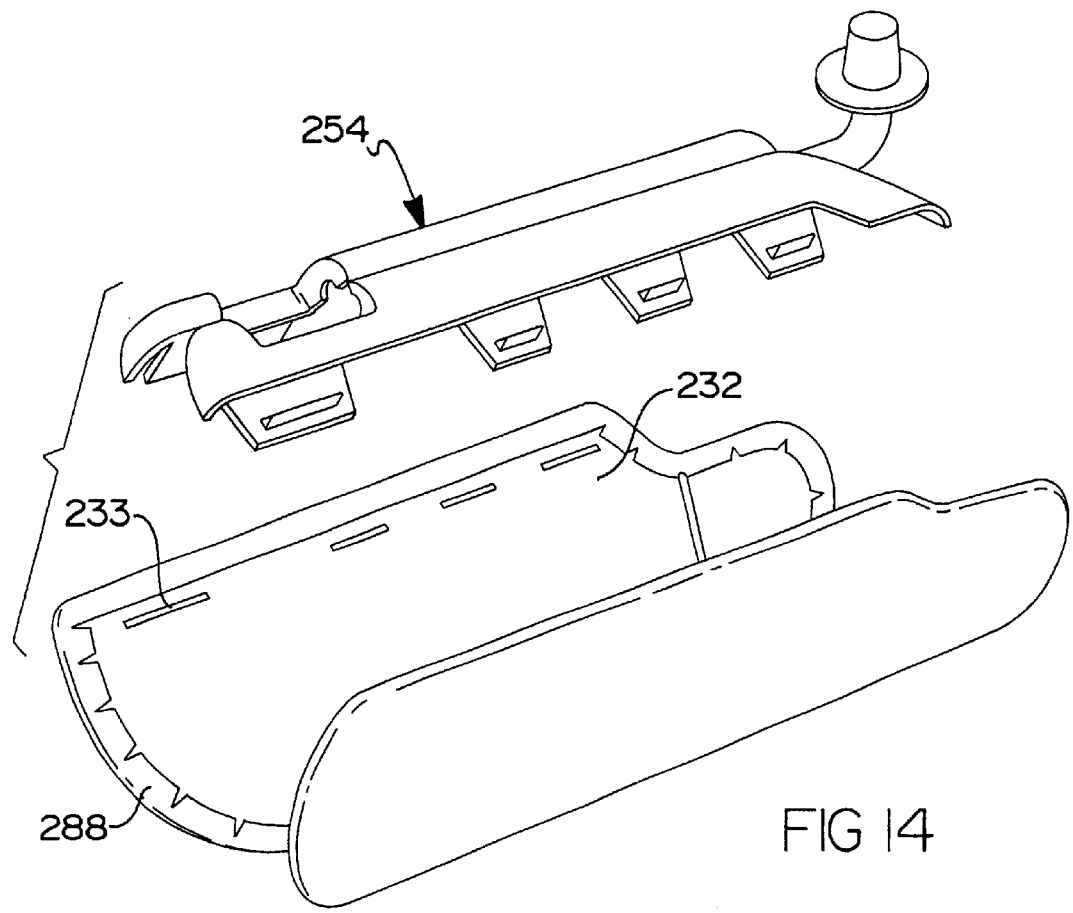

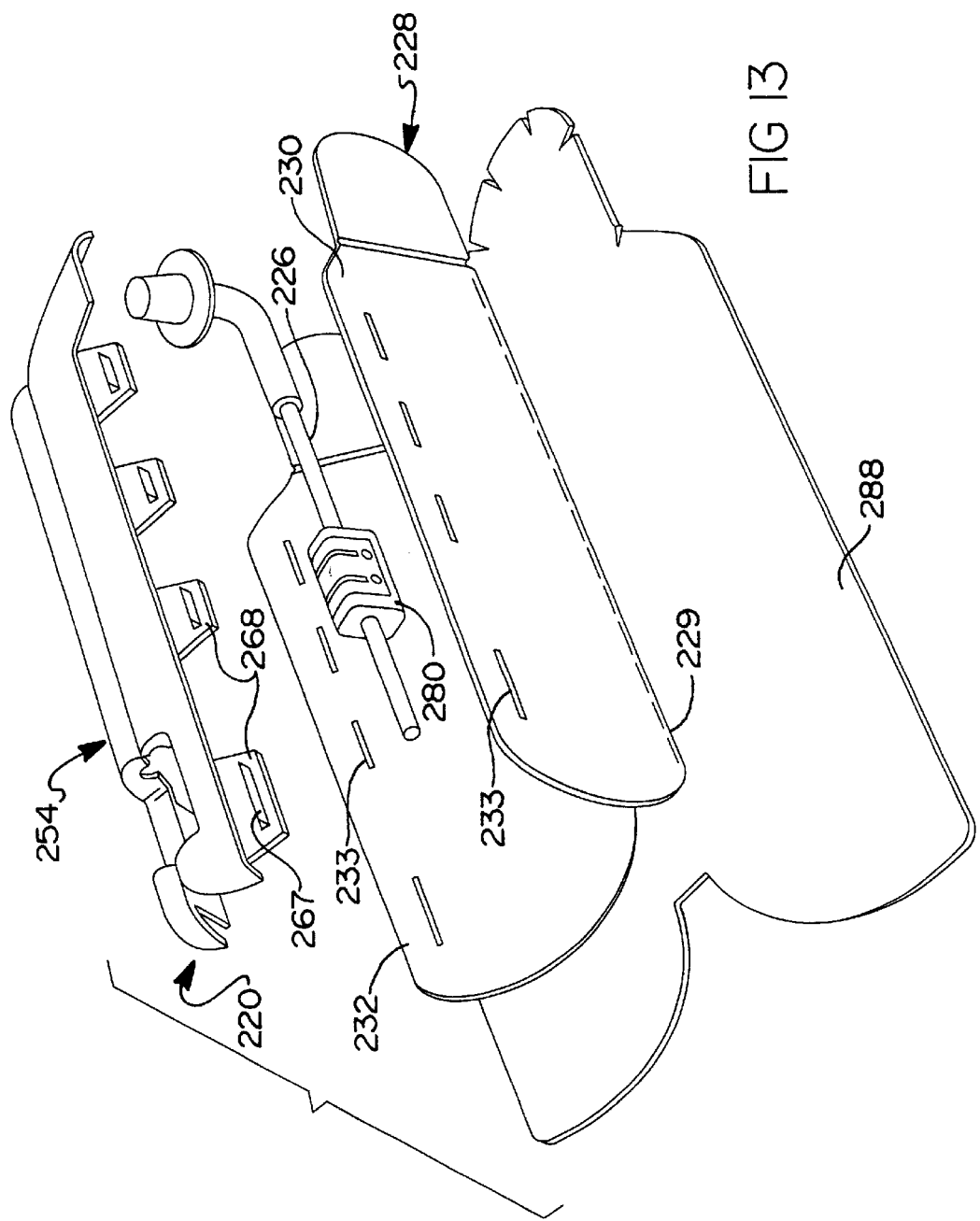

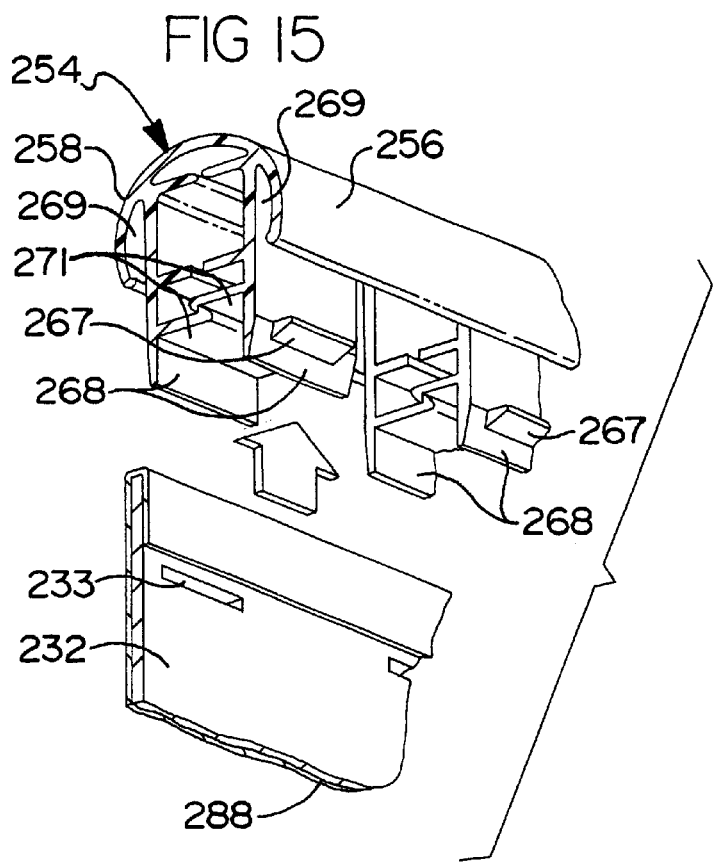
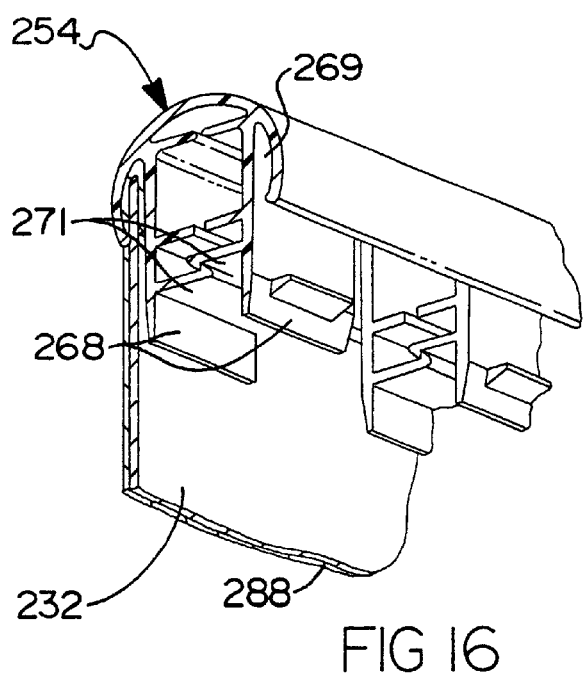

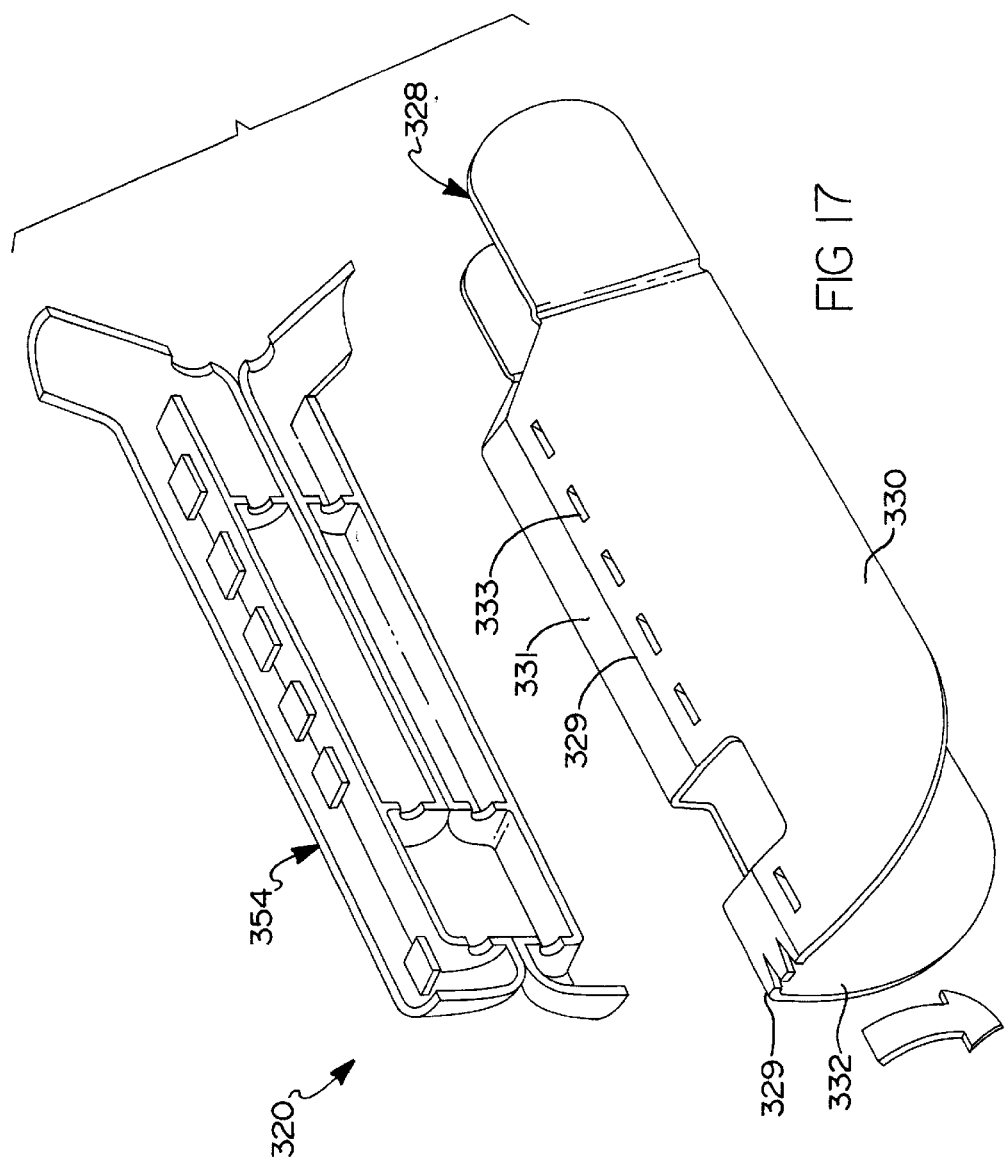

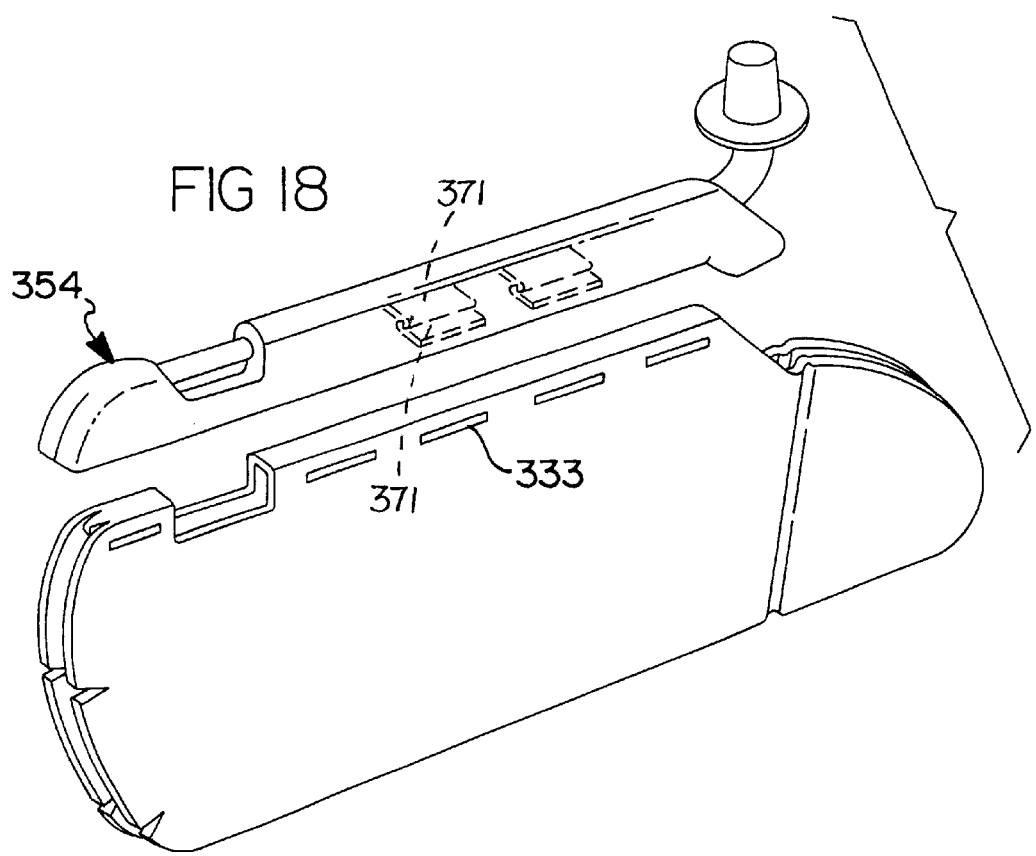
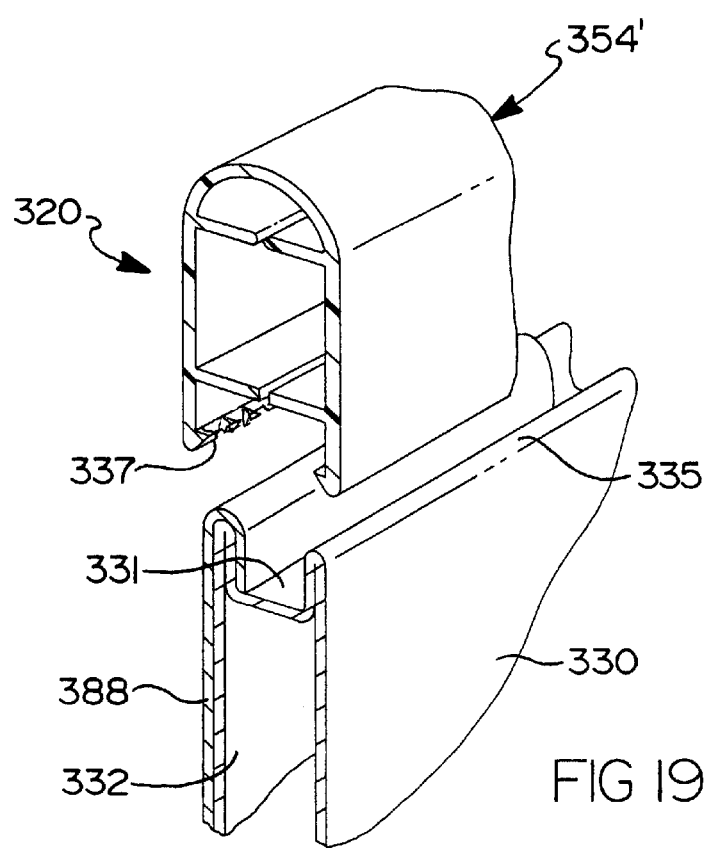

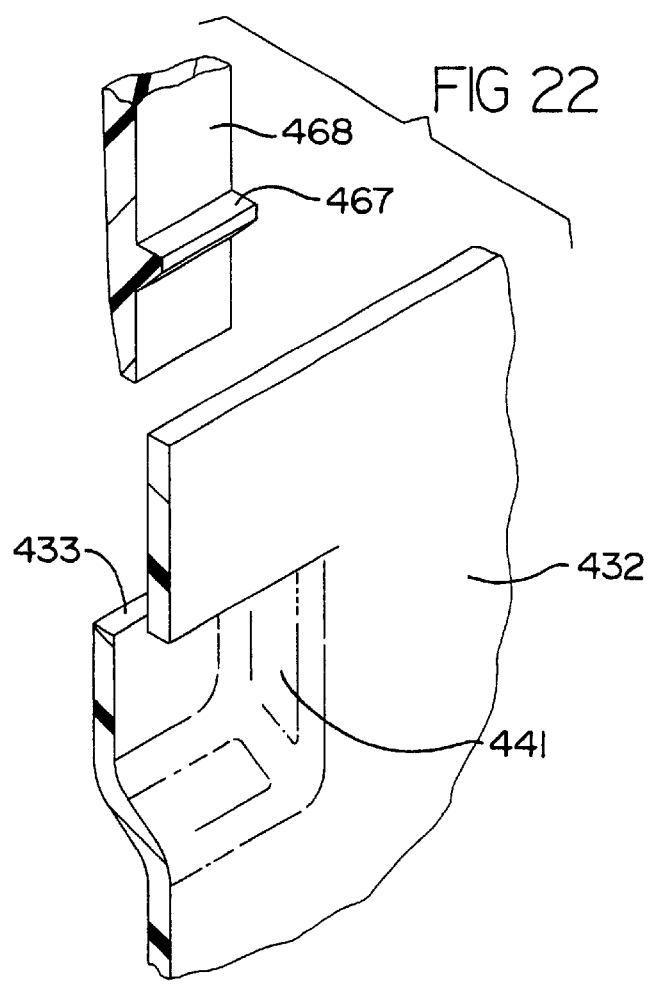
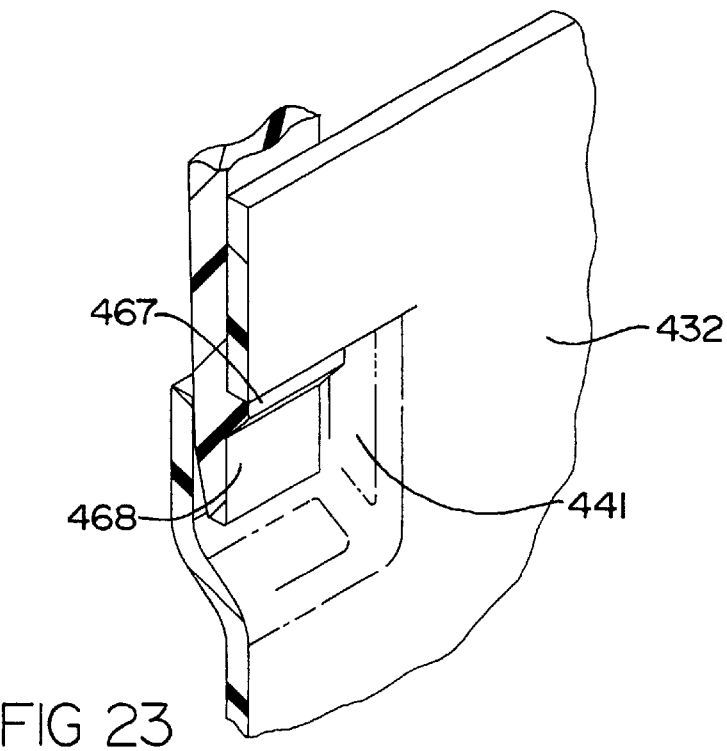

FIG 25
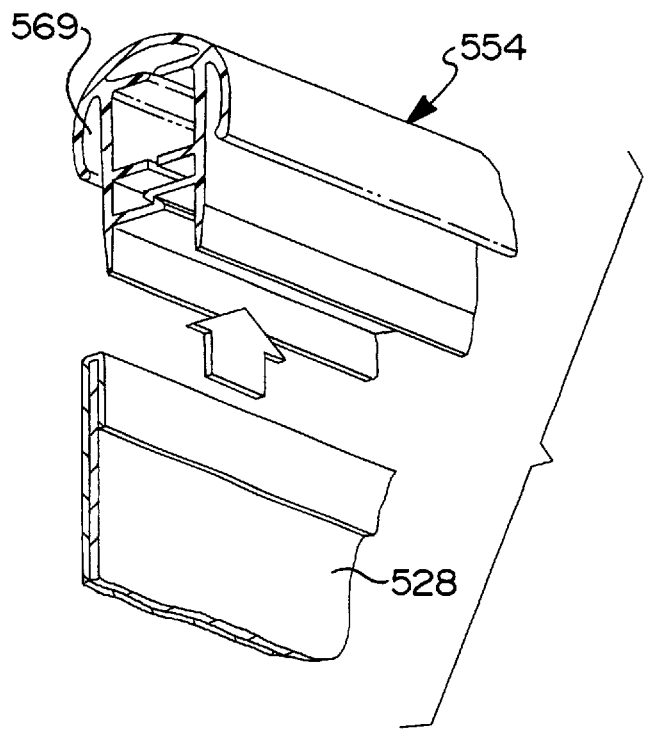
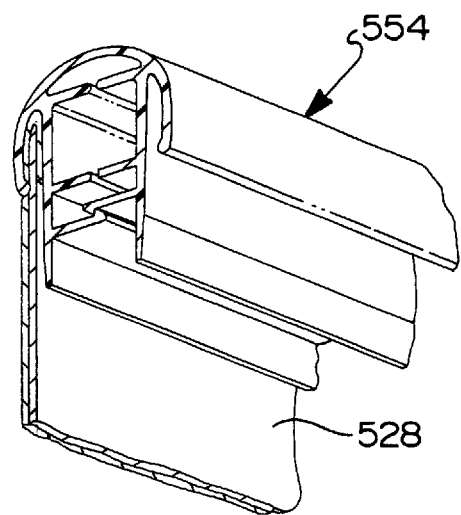
FIG 26

SLIDING SUN VISOR ASSEMBLY

BACKGROUND OF THE INVENTION

Field of the Invention

The present invention relates generally to a sun visor assembly that is moveably secured to a support rod, and more particularly to a sun visor assembly that is slidable on the support rod.

SUMMARY OF THE INVENTION

In accordance with the present invention, a sun visor is provided that includes a foundation upon which a decorative material is applied to form an outer surface of the sun visor. The foundation includes a pair of foundation halves that are at least partially secured together by a connecting member that forms an upper edge of the sun visor. The connecting member includes two connecting halves that are secured together to form a longitudinally extending channel therebetween. The sun visor further includes a support rod assembly having a rotation control member moveably connected to a support rod. The support rod assembly is removably received within the longitudinally extending channel of the connecting member to permit the sun visor to slide relative to the support rod.

In one embodiment of the present invention, the rotation control member is fixedly secured within the longitudinally extending channel. In this embodiment, the support rod is rotatably and slidably connected to the rotation control member. The connecting member, foundation and rotation control member slide relative to the support arm as the sun visor is extended.

In another embodiment of the present invention, the rotation control member is free to slide within the longitudinally extending channel. In this embodiment, the support rod is rotatably connected to the rotation control member. The connecting member and foundation slide relative to the support arm as the sun visor is extended.

Various additional aspects of this invention will become apparent to those skilled in the art from the following detailed description of the preferred embodiment, when read in light of the accompanying drawings.

BRIEF DESCRIPTION OF THE DRAWINGS

FIG. 2 is cut-away perspective view showing the various components of the sun visor of FIG. 1.

FIG. 4 is a perspective view of the sun visor of the present invention shown with an optional vanity mirror assembly and a connecting member disposed over a decorative cover.

FIG. 5 is a perspective view of the foundation of the sun visor shown in FIG. 4 illustrating an aperture and recessed tabs to facilitate attachment of the vanity mirror assembly.

FIG. 6 is an enlarged perspective view of the detail indicated in FIG. 5.

FIG. 9 is a perspective view of a sun visor foundation ear according to an embodiment of the present invention showing the foundation ear during manufacture.

FIG. 10 is another perspective view of the sun visor foundation ear of FIG. 9 after manufacture.

FIG. 12 is a partial perspective view of the support arm assembly received within the longitudinally extending channel of the connecting member.

FIG. 13 is an exploded perspective view of a sun visor according to another embodiment of the present invention.

FIG. 14 is another perspective view of the sun visor of FIG. 13 after attachment of the decorative material to the foundation.

FIGS. 15 and 16 are partial perspective views of the sun visor of FIG. 13 before and after attachment of the connecting member to a foundation half, respectively.

FIG. 17 is an exploded perspective view of a sun visor according to another embodiment of the present invention.

FIG. 18 is a partial cut-away perspective view of the sun visor of FIG. 17 after attachment of the connecting member to the foundation.

FIG. 19 is a perspective view of the connecting member and foundation according to another embodiment of the present invention.

FIGS. 22 and 23 are partial perspective views of the sun visor of FIG. 20 before and after attachment of the connecting member to the foundation, respectively.

FIGS. 25 and 26 are partial perspective views of the connecting member of FIG. 24 before and after attachment of the connecting member to the foundation, respectively.

DESCRIPTION OF THE PREFERRED EMBODIMENT

Figure 1:
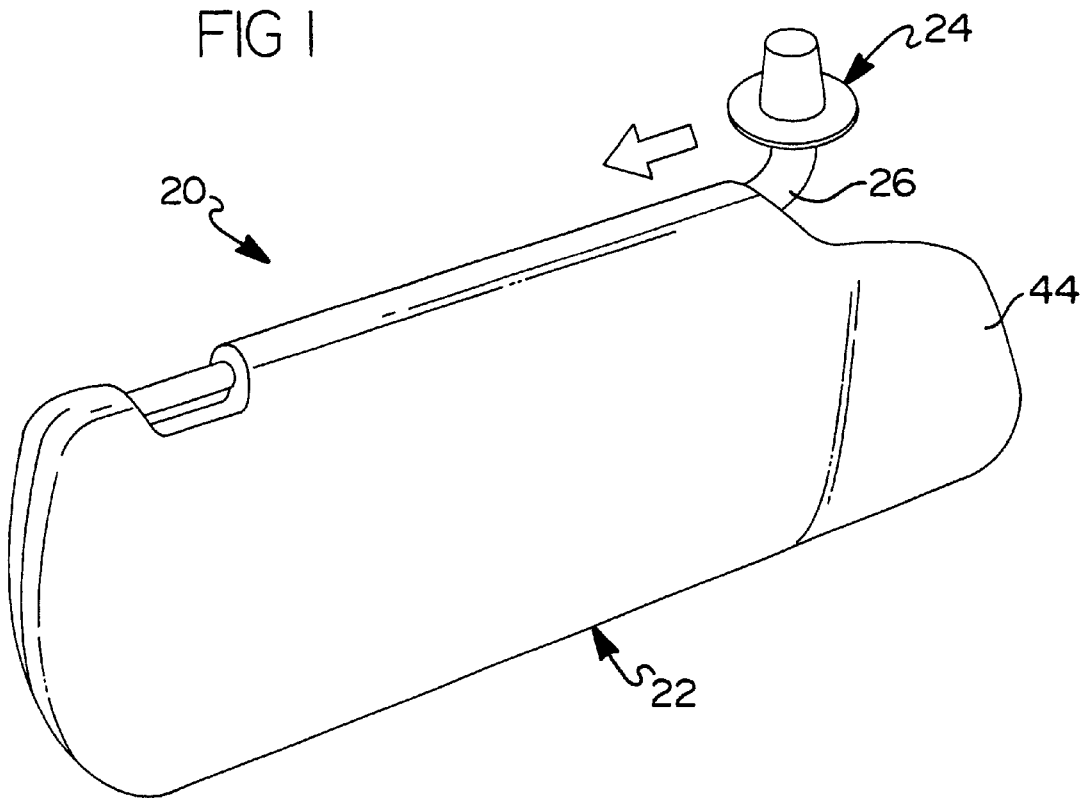
FIG. 1 is a perspective view of a sun visor assembly according to the present invention.
Figure 3:
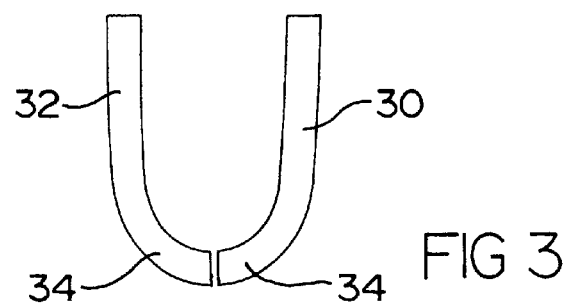
FIG. 3 is a cross-sectional view of the sun visor shown in FIGS. 1 and 2 along line 3—3.
Figure 7:
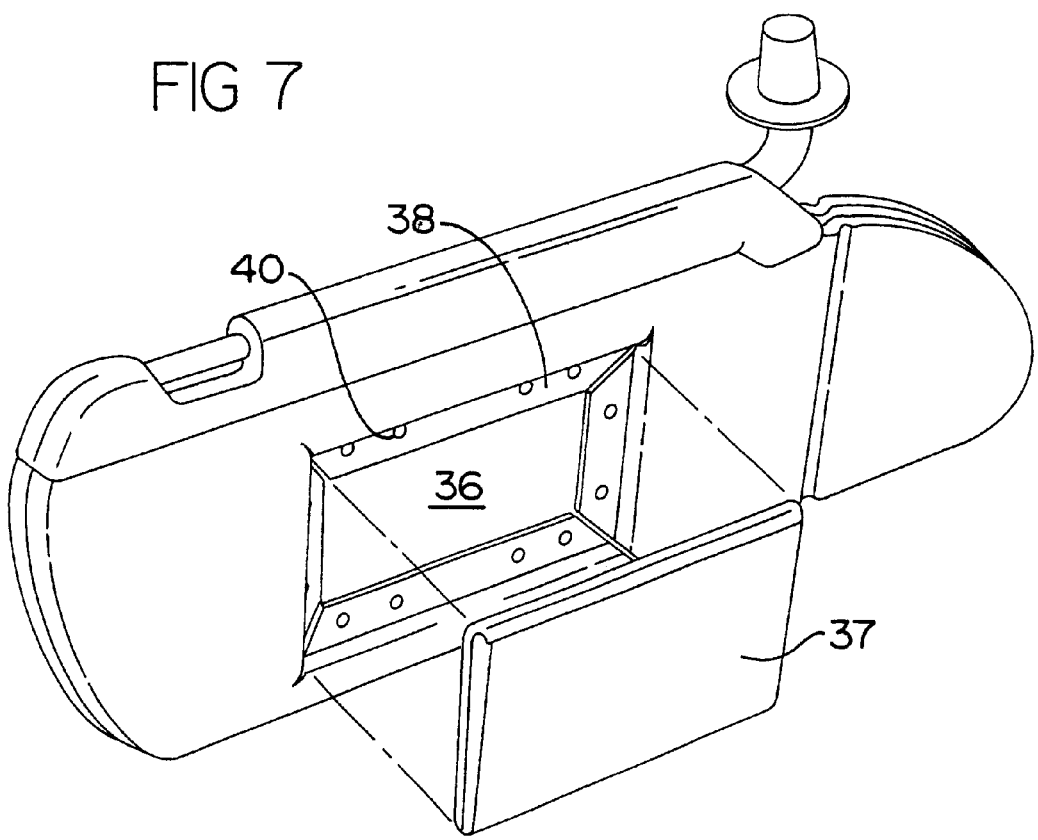
FIG. 7 is a perspective view of the sun visor of FIG. 4 prior to attachment of the vanity mirror assembly.
Figure 8:
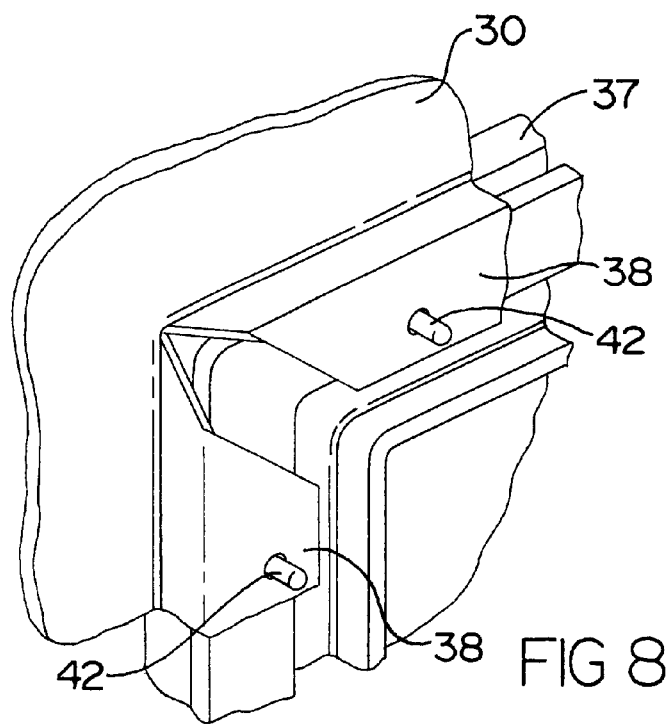
FIG. 8 is an enlarged perspective view of the foundation during attachment of the vanity mirror assembly.

Referring now to the drawings, preferred embodiments of the present invention are shown in detail. Referring to FIG. 1, there is shown a sun visor assembly 20 that includes a sun visor body 22 that is operably connected to a vehicle headliner (not illustrated) by a mounting bracket assembly 24. Mounting bracket assembly 24 secures sun visor body 22 to a vehicle roof panel and/or headliner and permits sun visor body 22 to be pivoted about a substantially vertical axis from a storage position proximate the front windshield of the vehicle to a first use position proximate a side window. Sun visor body 22 is rotatably supported on a visor support rod 26 that extends from mounting bracket assembly 24, such that sun visor body 22 may be pivoted about a substantially horizontal axis between the storage position and a second use position adjacent the front windshield.

As illustrated in FIG. 2, sun visor body 22 includes a self-supporting foundation 28 that includes a pair of foundations halves 30 and 32. Foundation halves 30 and 32 are prepared by a die cutting or stamping operation, or by molding depending on the material. Foundation halves 30, 32 may be prepared as two discrete halves or formed in one butterfly-like piece of thin self-supporting material that is folded about a hinge to create foundation halves 30, 32. The preferred foundation materials are kraft paper, cardboard, hardboard, such as "SUPERWOOD®" (a registered trademark of Georgia Pacific Corporation), and other compression formed natural or synthetic materials. In addition to cardboard and other composite materials, polymeric materials, such as plastic, that are formable and self-supporting can also be used in foundation 28.

In order to meet safety regulations promulgated by international authorities requiring contactable edges of a sun visor to have a rounded edge, foundation halves 30, 32 may optionally include a rounded lip portion 34, preferably having a bend radius of not less than approximately 3.2 mm (0.126 in). When foundation halves 30, 32 are secured together, rounded lip portions 34 mate to form a rounded edge whose cross-section is substantially semicircular. The term "mate," as used herein, is to be construed broadly to include variations in the way lip portions 34 are aligned with one another in assembled foundation 28. The use of hardboard or other formable materials in foundation 28 permits rounded lip portion 34 to be integrally formed around the periphery of foundation halves 30, 32 by compression molding foundation halves 30, 32 in a heated press. Alternatively, a separate bead member (not shown) having a rounded edge may be attached to each of foundation halves 30, 32 to cooperatively create the rounded edge. An exemplary bead member is shown and described in U.S. Pat. No. 6,302,467, which is owned by the assignee of the present invention and hereby incorporated by reference.

Referring to FIGS. 4–8, one of foundation halves 30, 32 may optionally include a mirror recess or aperture 36 for receipt of a vanity mirror assembly 37. Because foundation 28 is made of readily formable material, such as cardboard or kraft paper, the shape of aperture 36 may be die cut during the same die cutting operation employed to create the outer peripheral shape of foundation 28. In the exemplary embodiment illustrated in FIGS. 5 and 6, the inner periphery of aperture 36 is cut to create a plurality of tabs 38 that are then recessed below the outer surface of foundation 28 in a press. Tabs 38 include at least one hole 40 sized for receipt of a boss 42 (FIG. 8) that is attached to vanity mirror assembly 37. Each boss 42 can be heat staked or otherwise secured in holes 40 to retain vanity mirror assembly 28 in its recessed position within foundation 28.

It is also optional to permit a portion of sun visor body 22, known as the ear 44, to bend against the contour of the vehicle headliner as the sun visor is turned upward on support rod 26 to its storage position. As illustrated in FIGS. 9 and 10, ear 44 is preferably die cut from a single foundation half 30 or 32 and folded unto itself about a seam 46 to create two ear panels 48 and 50. Once folded, ear 44 has a single pivot seam 52 that allows ear 44 to easy flex without unduly stressing foundation 28. To reinforce and support ear 44, a portion of ear panel 50 may be folded perpendicular to the opposing ear panel 48.

Sun visor body 22 is also provided with a connecting member 54 that is secured to foundation 28 to movably connect foundation 28 to support rod 26. Shown in detail in FIG. 11, connecting member 54 is made of a rigid or semi-rigid material, such as plastic or metal, and includes a pair of connecting halves 56 and 58 that are separated by a living hinge 60. Hinge 60 is preferably integrally formed with halves 56, 58 in a molding operation or otherwise, such that connecting member 54 is a unitary structure. However, it is conceivably that connecting member 54 could include two discrete halves 56, 58 that are secured together during assembly.

Figure 11:
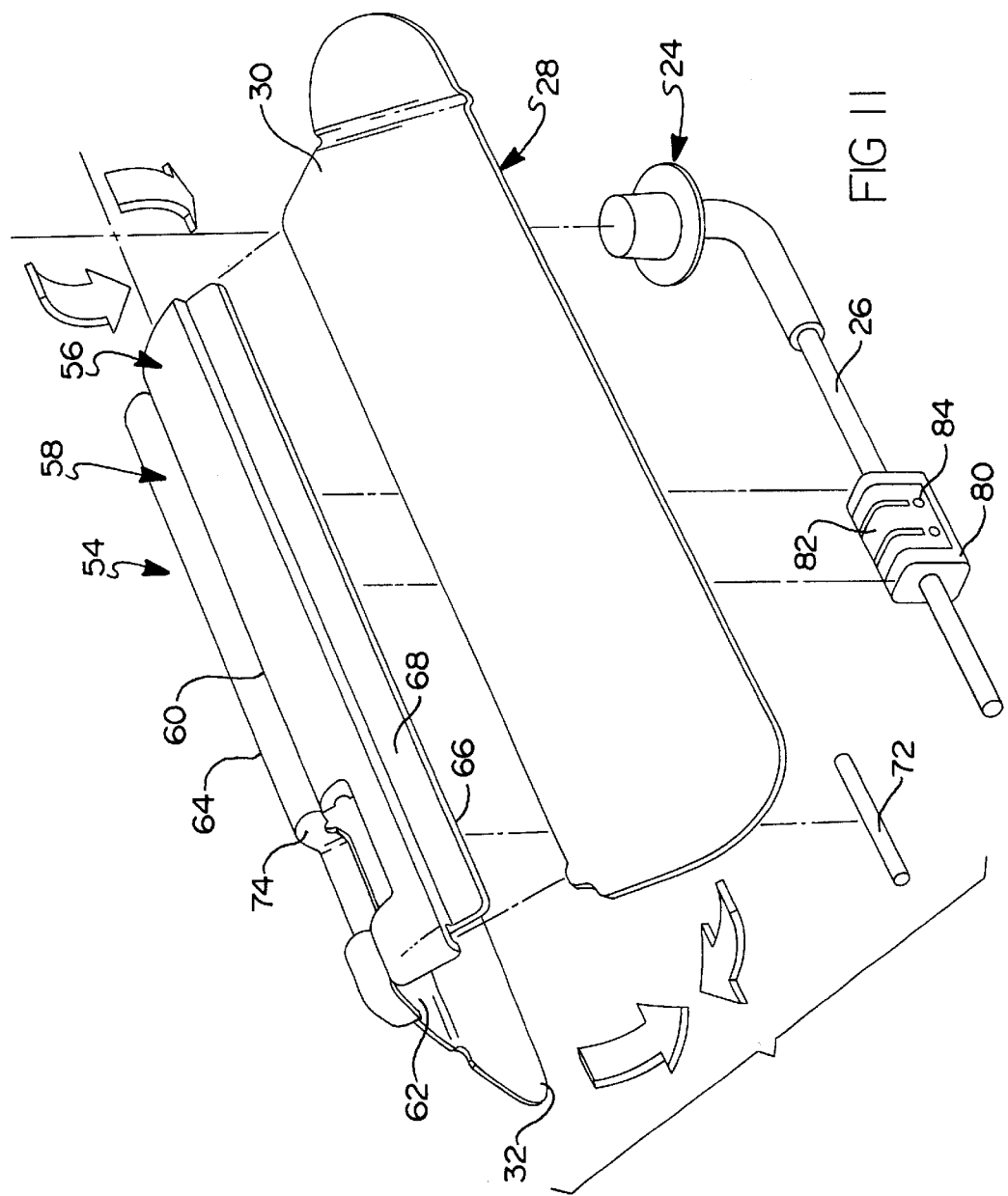
FIG. 11 is an exploded perspective view of the sun visor of FIG. 2.

As illustrated in FIG. 11, each connecting half 56, 58 includes an inner surface 62 and an outer surface 64. A distal end 66 of each connecting half 56, 58 is defined by a flange 68 that is secured to a corresponding foundation half 56, 58. Flanges 68 are slightly offset from outer surface 64 of connecting member 54, as shown in FIG. 11, to allow outer surface 64 of connecting halves 56, 58 to be substantially flush with an outer surface of foundation halves 30, 32 after assembly. Foundation halves 30, 32 may be secured to flanges 68 in any suitable manner, including, but not limited to adhesives, fasteners and the like. In an exemplary embodiment illustrated in the cut-away view of FIG. 2, flanges 68 are secured to foundation halves 30, 32 using a plurality of staples 70.

Referring to FIGS. 2 and 11, connecting member 54 also includes a retainer pin 72 received within an opening 74 defined by each of connecting halves 56, 58. Each end of retainer pin 72 is received within a recess 76 defined in connecting halves 56, 58 on each end of opening 74. As connecting halves 56, 58 are folded together during assembly of sun visor 20, retainer pin 72 is captured within recesses 76. When sun visor 20 is in use, retainer pin 72 is removably snap-fit into a retainer (not shown) mounted to the vehicle headliner, as is known in the art.

As also illustrated in FIG. 11, support rod 26 is connected to a rotation control member 80. Rotation control member 80 includes a generally U-shaped detent clamp 82 that is secured to detent member 80 with fasteners 84, such that an outer surface of detent clamp 82 is substantially flush with the outer surface of rotation control member 80. Support rod 26 includes at least one flat (not shown) that cooperates with detent clamp 82 to hold sun visor 20 in the storage position adjacent the vehicle headliner. Inner surface 62 of each connecting half 56, 58 is provided with a longitudinally extending channel 83 within which support rod 26 and rotation control member 80 are disposed.

In the embodiment illustrated in FIG. 12, rotation control member 80 is sized to easily slide within channel 78. In this embodiment, support rod 26 is axially, but not rotatably fixed to rotation control member 80. Accordingly, rotation control member 80 and support rod 26 are both moveable within channel 78. Rotation control member 80 is shown in FIGS. 11 and 12 as being generally rectangular and sized for sliding receipt within the generally rectangular channel 78. However, rotation control member 80 and channel 78 may exhibit any suitable shape that supports sliding movement of rotation control member 80 within channel 78.

Alternatively, rotation control member 80 may be fixed within channel 78 to prevent movement therein, as shown in FIG. 2. In this embodiment, support rod 26 is both axially and rotatably free to move relative to rotation control member 80. Accordingly, during extension of sun visor 20, support rod 26 alone will move relative to channel 78. To prevent movement of rotation control member 80, a recess 86 may be formed in channel 78, as illustrated in FIG. 2, such that rotation control member 80 abuts the inner wall of recess 86 as sun visor body 22 is extended on support rod 26.

The outer surface of sun visor 20 is covered with a suitable upholstery material or cover 88, such as fabric, vinyl or cloth with bonded foam backing, which completely covers the outer or exposed surface of the visor. It is also conceivable that the outer surfaces of foundation halves 30, 32 would have decorative surfaces or a coating applied thereto before or after assembly into sun visor 20, eliminating the need for a separate decorative material. Optionally, as illustrated in FIG. 4, cover 88 may be applied only to foundation 28 leaving connecting member 54 exposed after assembly.

A method of manufacturing sun visor 20 will now be described with reference to FIG. 11. Prior to assembly of foundation halves 30 and 32, connecting member 54 is secured to each foundation half 30, 32 in the manner described above. Optionally, internally disposed sun visor components, such as wiring for vanity mirror assembly 37, are aligned and/or fixed in their corresponding assembly positions between foundation halves 30, 32. Connecting half 56 is then folded unto connecting half 58 about hinge 60 or otherwise secured thereto if connecting member 54 includes two discrete halves 56, 58.

Foundation halves 30, 32 may be secured together using various connecting means, including, but not limited to, fasteners, adhesives and the like. When fasteners are used to secure foundation halves 30, 32 together, the fasteners may be received in co-aligned apertures (none shown), with each end of the fastener disposed in an indentation, such that no part of the fastener extends beyond the outer surface of foundation halves 30, 32. Alternatively, a non-expanding glue or other suitable adhesive may be disposed around the periphery of connecting halves 56, 58 and/or foundation halves 30, 32, prior to folding foundation half 30 against foundation half 32.

As described above, cover 88 may be applied to foundation halves 30, 32 either before or after connecting member is secured to foundation 28. An adhesive applied around the periphery of cover 88 may be employed to affix cover 88 to foundation halves 30, 32 and connecting member 54. It is also contemplated that cover 88 may be sonic or vibratory welded to foundation halves 30, 32 and connecting member 54. Finally, the various sun visor components that are secured over cover 88, such as vanity mirror assembly 37, are assembled to foundation halves 30, 32.

Referring to FIG. 13, another embodiment of the present invention is shown in detail. In this embodiment, a sun visor assembly 220 is provided that includes a foundation 228, a connecting member 254 and a support rod 226 that is moveably attached to a rotation control member 280. Sun visor 220 includes a butterfly-like panel of self-supporting material, such as kraft paper, that is folded unto itself to create foundation 228. Foundation halves 230 and 232 are folded about crease lines indicated generally as element 229, which provide a living hinge for foundation 228. Adjacent an upper edge of each of foundation halves 230, 232 is disposed at least one aperture 233. A cover 288 is wrapped around the bottom of foundation 228 and affixed to the edge of foundation halves 230 and 232, as shown in FIG. 14.

Referring to FIGS. 15 and 16, connecting member 254 includes at least one downwardly extending flange 268 having a catch 267. As foundation halves 230, 232 are inserted into a recess 269 between flange 268 and the outer surface of connecting member 254, catch 267 engages a corresponding aperture 233 in foundation halves 230, 232. Optionally, opposing flanges 268 on each connecting half 256, 258 may include a substantially perpendicular catch 271 that cooperatively engage during assembly to secure connecting halves 256, 258 together.

Referring to FIGS. 17 and 18, another embodiment of the present invention is shown in detail. In this embodiment, a sun visor assembly 320 is provided that includes a foundation 328 and a connecting member 354. Sun visor 320 includes a butterfly-like panel of self-supporting material, such as kraft paper, that is folded unto itself to create foundation 328. However, unlike upwardly folding foundation 228 described above, foundation 328 folds downward from connecting member 354. Also, foundation 328 includes a pair of discrete crease lines 329 about which foundation 328 is folded. Crease lines 329 allow foundation 328 to be folded in two distinct regions to create a flat surface 331 upon which connecting member 354 rests. Adjacent crease lines 329 are disposed at least one aperture 333 in each of foundation halves 330, 332. Foundation halves 330, 332 may be formed with a rounded lip portion (not shown) that is substantially similar to rounded lip portion 34 or a separate bead member may be attached to foundation halves 330, 332, as described above, prior to assembly.

Connecting member 254 is substantially similar to connecting member 154 described above with at least one exception, namely, perpendicular catches 371 extend through apertures 333 to secure connecting member 254 to foundation 328. Referring to FIG. 18, cover 388 is wrapped around foundation 328 and is fixed to foundation halves 230, 232 adjacent their peripheral edges. Connecting member 354 is then closed and catches 371 are pushed inwardly through apertures 333 to secure connecting member 354 to foundation 328.

Referring to FIG. 19, an alternate embodiment of sun visor 320 described above is shown. In this embodiment, flat surface 331 is recessed relative to a top edge 335 of foundation halves 330, 332. Recessing flat surface 331 allows cover 388 to be wrapped around top edge 335 of each foundation half 330, 332 and fixed to the inside surface of the recess. This feature also allows cover 388 to be wrapped around the bottom of foundation 328 to eliminate the cover seam along the bottom of sun visor 320. Once assembled, the only visible seam in cover 388 is the seam along the sides of sun visor 320 where foundation halves 330, 332 come together.

FIG. 19 also illustrates another embodiment of the present invention. In this embodiment, a connecting member 354' is provided that includes a plurality of teeth 337 that engage cover 388 and foundation 328 to secure connecting member 354 to foundation 328. Teeth 337 are provided in place of flanges 368 or catches 371; however, the use of flanges 368 or catches 371 would also function satisfactorily to secure connecting member 354 to foundation 328 provided apertures 333 were positioned below recessed surface 331.

Referring to FIGS. 20–23 there is shown another embodiment of the present invention. In this embodiment, a sun visor assembly 420 is provided that includes a foundation 428 and a connecting member 454. Connecting member 454, which is substantially similar to connecting member 254 described above, includes a plurality of flanges 468 that extend downwardly toward foundation 428. Flanges 468 each include a catch 467 that is configured to engage a corresponding aperture 433 in foundation halves 430, 432.

Figure 20:
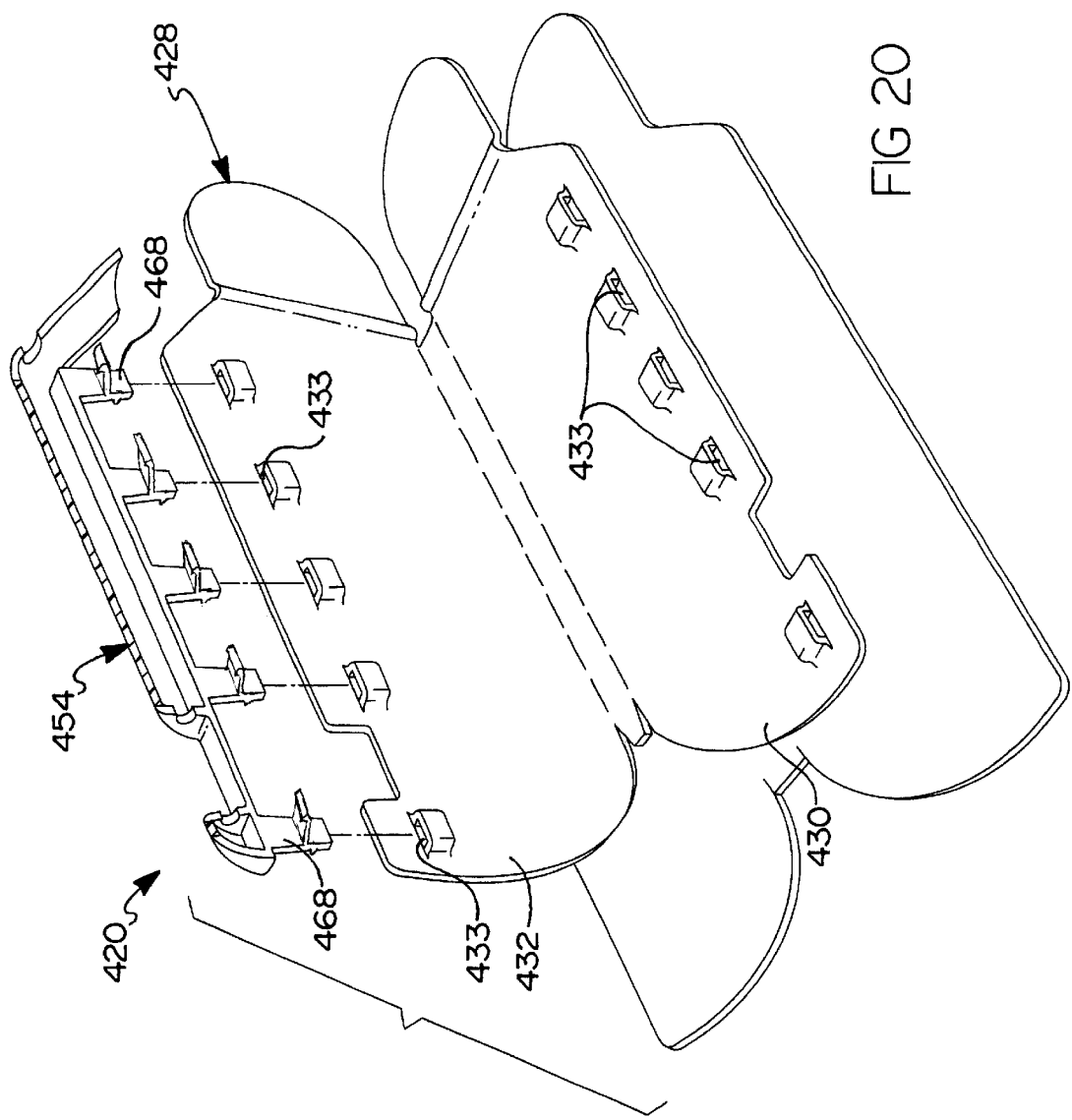
FIG. 20 is an exploded perspective view of a sun visor according to another embodiment of the present invention.
Figure 21:
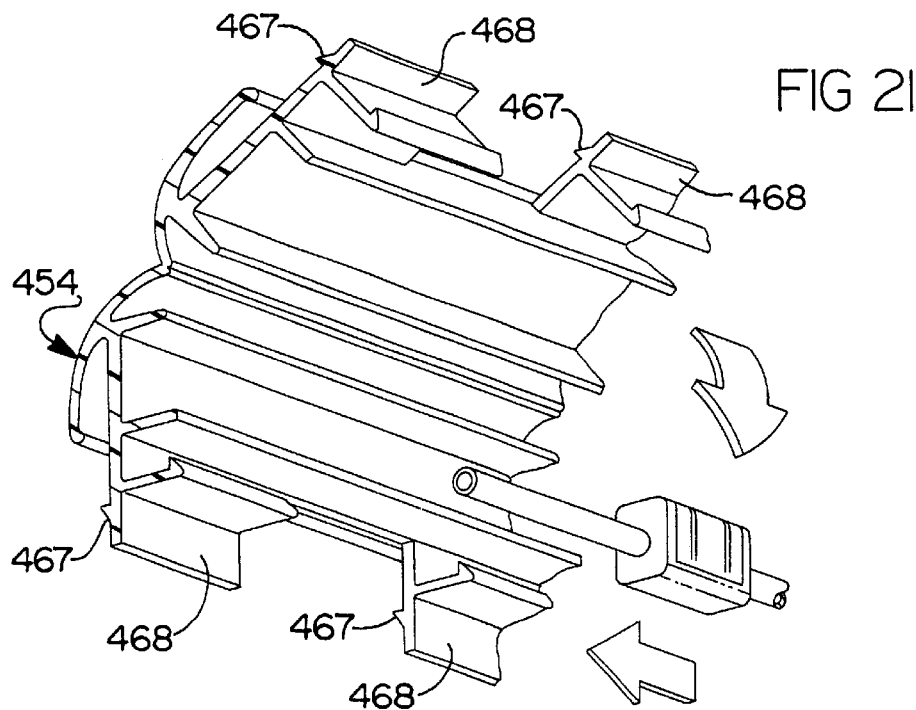
FIG. 21 is a perspective view of the connecting member shown in FIG. 20.

As shown in FIGS. 22 and 23, each aperture 433 in foundation halves 430, 432 is created by forming a recessed pocket 441. Recessed pocket 441 is preferably created by cutting a slit in the subject foundation half and then forming the shape of the recessed pocket in a mold or press. During assembly, flanges 468 are received in a corresponding recessed pocket 441, which allows catch 467 to engage an edge of aperture 433 to secure connecting member 454 to foundation 428. Although foundation 428 is shown in FIG. 20 in the butterfly configuration folded from the bottom of sun visor 420 upward, it will also be appreciated that connecting member 454 will function satisfactorily with a foundation 428 defined by two discrete foundation halves, as shown in FIG. 11, or a downwardly folded butterfly configuration, as shown in FIG. 17.

Figure 24:
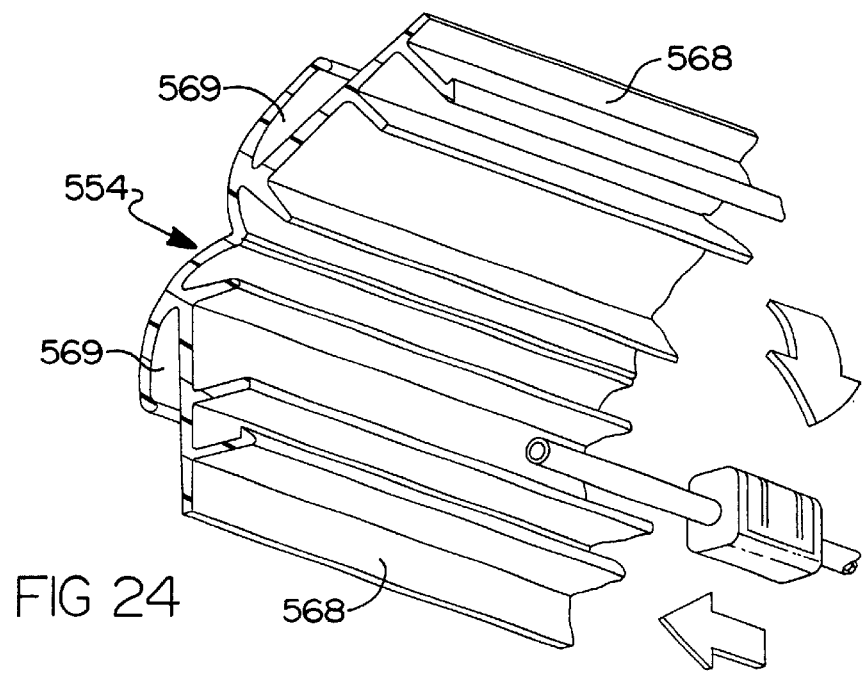
FIG. 24 is a perspective view of a connecting member according to another embodiment of the present invention.

Referring to FIGS. 24–26, another alternate embodiment of the present invention is shown. In this embodiment, a connecting member 554 is provided having a substantially uniform cross-sectional profile that is capable of being extruded in addition to being molded or otherwise formed. The cross-sectional profile of connecting member 554 is substantially similar to connecting member 454 with at least two exceptions, namely, connecting member 554 includes axially continuous flanges 568 and does not include catches 467. To secure foundation 528 to connecting member 554, foundation halves 530, 532 are press-fit into recesses 569. Optionally, an adhesive may be used within recesses 569 to reinforce the bond between foundation halves 530, 532 and connecting member 554.

Although certain preferred embodiments of the present invention have been described, the invention is not limited to the illustrations described and shown herein, which are deemed to be merely illustrative of the best modes of carrying out the invention. A person of ordinary skill in the art will realize that certain modifications and variations will come within the teachings of this invention and that such variations and modifications are within its spirit and the scope as defined by the claims.

What is claimed is:

1. A sun visor assembly comprising:
   a support rod assembly that includes a rotation control member moveably connected to a support rod;
   a foundation having a pair of foundation halves, the foundation halves having corresponding shapes that define at least a portion of an edge of the sun visor; and
   a connecting member secured to each foundation half and defining an upper edge of the sun visor, the connecting member including a pair of connecting halves that define a longitudinally extending channel for receiving the support rod assembly, the connecting member being slidable relative to at least a portion of the support rod assembly between a first position, whereby the support rod is retracted into the sun visor, and an second position, whereby the support rod is extended from the sun visor.

2. The sun visor assembly of claim 1, wherein the rotation control member is fixedly secured within the channel.

3. The sun visor assembly of claim 2, wherein the support rod is rotatably and slidably connected to the rotation control member.

4. The sun visor assembly of claim 1, wherein the rotation control member is slidably received within the channel.

5. The sun visor assembly of claim 4, wherein the support rod is rotatably connected to the rotation control member.

6. The sun visor assembly of claim 1, wherein a detent clamp is secured to the rotation control member, the detent clamp engaging the support rod to inhibit rotation of the rotation control member, the connecting member and the foundation relative to the support rod.

7. The sun visor assembly of claim 1, wherein the connecting member includes a retention pin.

8. The sun visor assembly of claim 1, wherein at least a portion of an outer periphery of each foundation half includes a rounded lip portion.

9. The sun visor assembly of claim 8, wherein the rounded lip portion is integrally formed in the foundation halves.

10. The sun visor assembly of claim 8, wherein the rounded lip portion is a bead member fixedly secured in the foundation halves.

11. The sun visor assembly of claim 1, wherein the foundation is in a butterfly-like configuration that is folded unto itself about a hinge to form the two foundation halves.

12. The sun visor assembly of claim 11, wherein the butterfly-like foundation folds downwardly from the connecting member.

13. The sun visor assembly of claim 11, wherein said butterfly-like foundation folds upwardly from the bottom of said sun visor toward the connecting member.

14. The sun visor assembly of claim 1, wherein the foundation includes two discrete foundation halves.

15. The sun visor assembly of claim 1, wherein the foundation includes one of a recess and an aperture for receiving a mirror assembly.

16. The sun visor assembly of claim 1, wherein each connecting half of the connecting member includes at least one flange.

17. The sun visor assembly of claim 16, wherein an upper portion of each foundation half is received in a recess defined by the flange and an outer surface of the connecting member.

18. The sun visor assembly of claim 17, wherein each foundation half is press-fit into the recess.

19. The sun visor assembly of claim 17, wherein each foundation half is glued into the recess.

20. The sun visor assembly of claim 16, wherein each foundation half is secured to a corresponding flange by at least one fastener.

21. The sun visor assembly of claim 16, wherein the flange includes a catch, the catch being received in an aperture in the foundation to secure the connecting member to the foundation.

22. The sun visor assembly of claim 16, wherein the flange includes at least one tooth, the tooth engaging the foundation to secure the connecting member to the foundation.

23. The sun visor assembly of claim 1, wherein the connecting halves each include an inwardly projecting catch, the catches positioned to cooperatively engage and secure the connecting halves together.

24. The sun visor assembly of claim 23, wherein the inwardly projecting catches are received through recesses in the foundation halves to secure the connecting member to the foundation.

25. A sun visor assembly comprising:
   a support rod assembly that includes a rotation control member moveably connected to a support rod;
   a foundation that includes a pair of foundation halves having corresponding shapes that define an edge of the sun visor assembly;
   a connecting member secured to each foundation half and defining an upper edge of the sun visor, the connecting member including a pair of connecting halves pivotably connected by a hinge; the connecting halves foldable about the hinge to create a longitudinally extending channel for receiving the support rod assembly, at least a portion of the support rod assembly being slidable within the channel of the connecting member between a first position, whereby the support rod is retracted into the sun visor, and an second position, whereby the support rod is extended from the sun visor; the connecting halves further including at least one flange that facilitates attachment of the connecting member to the foundation; and
   a decorative material covering at least said foundation.

26. The sun visor assembly of claim 25, wherein each foundation half is received in a recess defined by the flange and an outer surface of the connecting member.

27. The sun visor assembly of claim 25, wherein each foundation half is secured to a corresponding flange by at least one fastener.

28. The sun visor assembly of claim 25, wherein the flange includes a catch, the catch being received in an aperture in the foundation to secure the connecting member to the foundation.

29. The sun visor assembly of claim 25, wherein the flange includes at least one tooth, the tooth engaging the foundation through the decorative material to secure the connecting member to the foundation.

30. The sun visor assembly of claim 25, wherein the connecting halves each include an inwardly projecting catch, the catches positioned to cooperatively engage and secure the connecting halves together.

31. The sun visor assembly of claim 30, wherein the inwardly projecting catches are received through recesses in the foundation halves to secure the connecting member to the foundation.

32. The sun visor assembly of claim 25, wherein the rotation control member is fixedly secured within the channel.

33. The sun visor assembly of claim 32, wherein the support rod is rotatably and slidably connected to the rotation control member.

34. The sun visor assembly of claim 25, wherein the rotation control member is slidably received within the channel.

35. The sun visor assembly of claim 34, wherein the support rod is rotatably connected to the rotation control member.

* * * * *